United States Patent [19]

Child

[11] Patent Number: 4,966,087

[45] Date of Patent: Oct. 30, 1990

[54] FLUIDIZED BED COAL/COKE COMBUSTION

[75] Inventor: Jonathan E. Child, Sewell, N.J.

[73] Assignee: Mobil Oil Corporation, New York, N.Y.

[21] Appl. No.: 322,732

[22] Filed: Mar. 13, 1989

Related U.S. Application Data

[63] Continuation-in-part of Ser. No. 84,243, Aug. 12, 1987, Pat. No. 4,812,431.

[51] Int. Cl.⁵ .................... F23J 11/00; F23J 15/00
[52] U.S. Cl. .................................. 110/345; 110/347
[58] Field of Search ............... 110/342, 343, 344, 345, 110/347; 502/42

[56] References Cited

U.S. PATENT DOCUMENTS 4,483,259  11/1984  Muiayem et al. ................... 110/345

Primary Examiner—Edward G. Favors
Attorney, Agent, or Firm—Alexander J. McKillop; Charles J. Speciale; Richard D. Stone

[57] ABSTRACT

A fluidized combustion process is disclosed which is especially suitable for fluidized bed burning of coal and coke while minimizing emissions of NOx. A single, dense phase fluidized bed or particles is used to burn the coal or coke with air or oxygen containing gas to produce heat and a flue gas containing CO, CO2, O2 and NOx. A CO combustion promoter on a porous support is present in an amount sufficient to increase the combustion of CO to CO2 in the dense bed. Preferably the CO combustion promotor is disposed on particles which either float or have a settling velocity which is smaller than the settling velocity of the average particles in the dense phase fluidized bed. CO combustion promoter preferably floats or segregates in the dense phase fluidized bed so that a majority of the combustion promoter is present in an upper one half of the dense bed. Maintaining a reducing atmosphere in the lower one half of the dense bed converts NOx produced during combustion to nitrogen in the reducing atmosphere. Preferably an external means is provided to recover entrained CO combustion promoter from coal, ash, and fines generated in the fluidized bed. An external, dense phase fluidized bed may be used to effect separation by density differences, or flotation separation, using a liquid with a density intermediate the density of the promoter and the fines may be used.

19 Claims, 3 Drawing Sheets

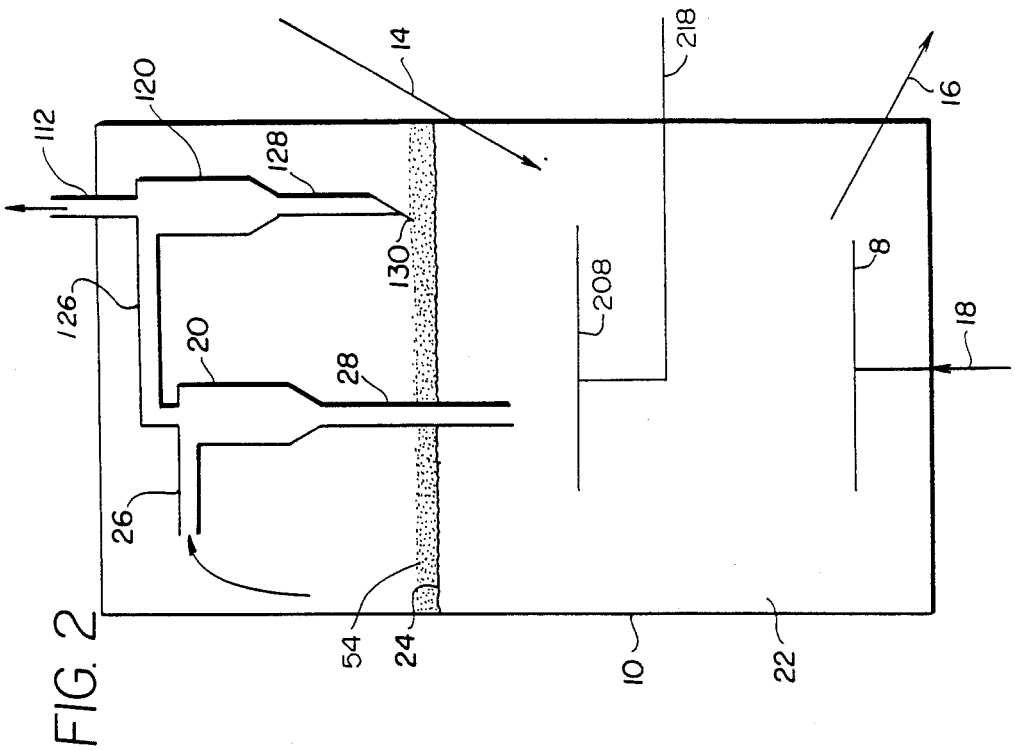
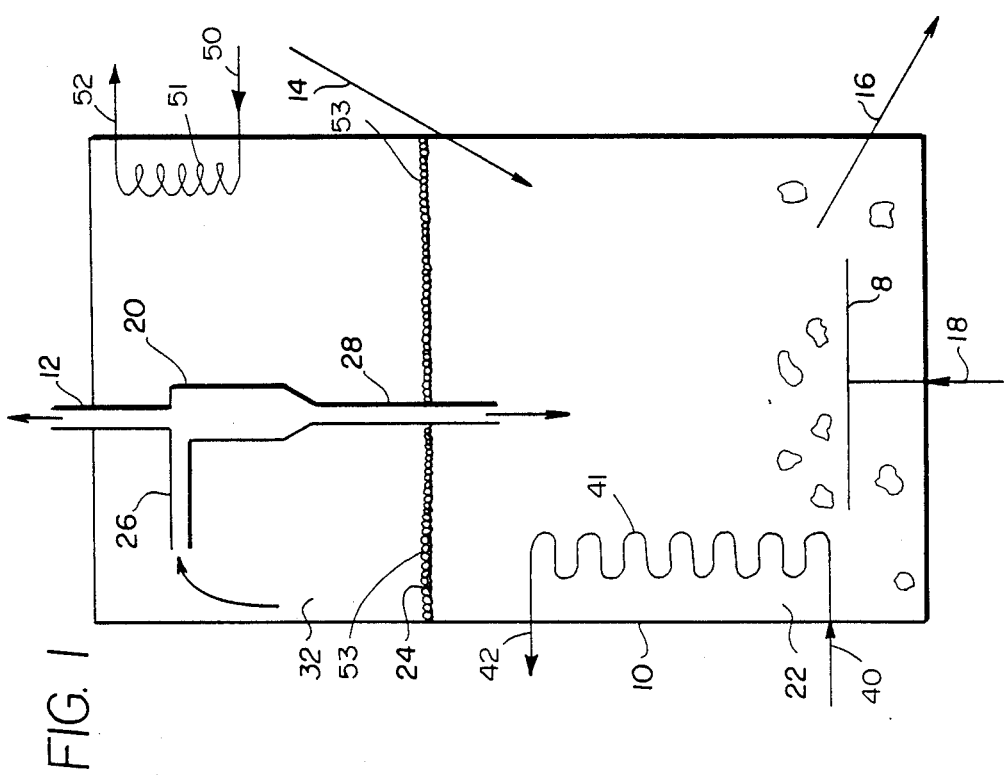

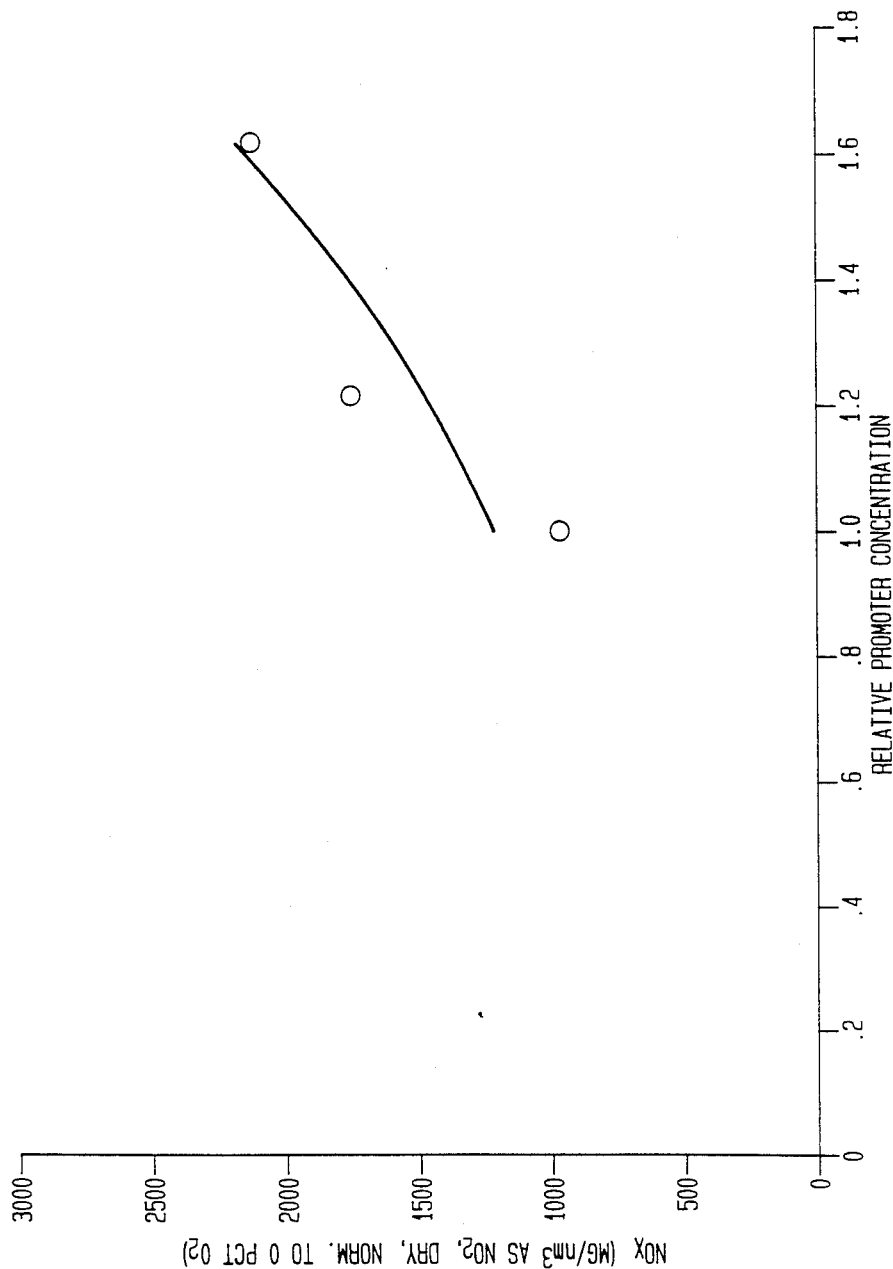

FLUIDIZED BED COAL/COKE COMBUSTION

CROSS-REFERENCE TO RELATED APPLICATIONS

This application is a Continuation-In-Part of prior co-pending application Ser. No. 084,243, filed Aug. 12, 1987 now U.S. Pat. No. 4,812,431, which is incorporated herein by reference.

BACKGROUND OF THE INVENTION

1. Field of the Invention

The field of the invention is combustion in a fluidized bed.

2. Description of Related Art

There are many fluidized bed combustion processes used commercially. Typical processes include the regenerators associated with FCC units, the regenerators used in fluid cokers, and combustion of coal, coke or similar substances in a dense bed to produce heat.

It is desirable to burn CO, produced by burning the coke or coal, to CO2 completely within the dense phase fluidized bed associated with the catalyst regenerator, fluid coker regenerator, or bed of coal. Complete combustion of CO to CO2 maximizes heat generation and minimizes air pollution.

Among the ways suggested to burn CO in FCC regenerators is to add a CO combustion promoter metal to the catalyst or to the regenerator. Metals have been added as an integral component of the cracking catalyst and as a component of a discrete particulate additive, in which the active metal is associated with a support other than the catalyst. U.S. Pat. No. 2,647,860 proposed adding 0.1 to 1 weight percent chromic oxide to a cracking catalyst to promote combustion of CO. U.S. Pat. No. 3,808,121, incorporated herein by reference, introduced relatively large-sized particles containing CO combustion-promoting metal into a cracking catalyst regenerator. The circulating particulate solids inventory, of small-sized catalyst particles, cycles between the cracking reactor and the catalyst regenerator, while the combustion-promoting particles remain in the regenerator. Oxidation-promoting metals such as cobalt, copper, nickel, manganese, copper-chromite, etc., impregnated on an inorganic oxide such as alumina, are disclosed.

U.S. Pat. Nos. 4,072,600 and 4,093,535 teach use of combustion-promoting metals such as Pt, Pd, Ir, Rh, Os, Ru and Re in cracking catalysts in concentrations of 0.01 to 50 ppm, based on total catalyst inventory.

Some work has been done on promoting carbon burning reactions by adding Pt coated sand to a bed of burning coke. Walsh and Green, in U.S. Pat. No. 4,515,092, which is incorporated herein by reference, reported that coke burning rates were increased, and that combustion efficiency improved as well. They used Pt on a relatively low surface area support, and found that fairly high Pt concentrations gave better results. Burning a small amount of solid fuel in a bed of sand, with no promoter being on the sand, gave a coke burning rate of 1.0 (base), while use of sand containing 1 wt % Pt increased the burning rate of the coke to 2.3. Essentially complete CO combustion to CO2 was always obtained, but the amount of Pt present was relatively large, 1 wt% of the fluidized bed, while the fuel was present in amounts ranging from 0.1 to 10 wt. % of the fluidized bed.

The patentees sought to avoid the problem of Pt loss by using a substrate which would remain in the fluidized bed.

Sand, and other low surface area materials were the preferred substrates for the Pt, but the possibility of using higher surface area supports, such as silica alumina, gamma alumina, and silica was mentioned, but no examples were provided on a support other than sand (80-240 mesh sand was used in the experiments).

Recovery of Pt on promoter from fines for recycle to the fluidized bed unit was not addressed.

Complete combustion of CO to CO2 in fluidized bed combustion will of course reduce CO emissions, but can cause as increase in NOx emissions. This has been the experience of FCC operators.

Many FCC units use CO combustion promoters. This reduces CO emissions, but usually increases nitrogen oxides (NOx) in the regenerator flue gas. It is difficult in a catalyst regenerator to completely burn coke and CO in the regenerator without increasing the NOx content of the regenerator flue gas.

Although many refiners have recognized the problem of NOx emissions from FCC regenerators, the solutions proposed have not been completely satisfactory. The approaches taken so far have generally been directed to special catalysts which will inhibit the formation of NOx in the FCC regenerator, or to process changes which reduce NOx emissions from the regenerator.

Recent catalyst patents include U.S. Pat. No. 4,300,997 and its division U.S. Pat. No. 4,350,615, both directed to the use of Pd-Ru CO-combustion promoter. The bi-metallic CO combustion promoter is reported to do an adequate job of converting CO to CO2, while minimizing the formation of NOx.

Another catalyst development is disclosed in U.S. Pat. No. 4,199,435 which suggests steam treating conventional metallic CO combustion promoter to decrease NOx formation without impairing too much the CO combustion activity of the promoter.

Process modifications are suggested in U.S. Pat. No. 4,413,573 and U.S. Pat. No. 4,325,833 directed to two- and three-stage FCC regenerators, which reduce NOx emissions.

U.S. Pat. No. 4,313,848 teaches countercurrent regeneration of spent FCC catalyst, without backmixing, to minimize NOx emissions.

U.S. Pat. No. 4,309,309 teaches the addition of a vaporizable fuel to the upper portion of a FCC regenerator to minimize NOx emissions. Oxides of nitrogen formed in the lower portion of the regenerator are reduced in the reducing atmosphere generated by burning fuel in the upper portion of the regenerator.

U.S. Pat. No. 4,235,704 suggests that too much CO combustion promoter causes NOx formation, and calls for monitoring the NOx content of the flue gases, and adjusting the concentration of CO combustion promoter in the regenerator based on the amount of NOx in the flue gas.

The approach taken in U.S. Pat. No. 4,542,114 is to minimize the volume of flue gas by using oxygen rather than air in the FCC regenerator, with consequent reduction in the amount of flue gas produced.

All the catalyst and process patents discussed above from U.S. Pat. No. 4,300,997 to U.S. Pat. No. 4,542,114, are incorporated herein by reference.

In addition to the above patents, there are myriad patents on treatment of flue gases containing NOx. The flue gas might originate from FCC units, or other units.

U.S. Pat. No. 4,521,389 and U.S. Pat. No. 4,434,147 disclose adding NH3 to NOx containing flue gas and catalytically reducing the NOx to nitrogen.

None of the approaches described above provides the perfect solution. Process approaches which reduce NOx emissions require extensive rebuilding of the FCC regenerator.

Various catalytic approaches, e.g., use of bi-metallic CO combustion promoters, provide some assistance, but the cost and complexity of a bi-metallic combustion promoter is necessary. The reduction in NOx emissions achieved by catalytic approaches helps some but still may fail to meet the ever more stringent NOx emissions limits set by local governing bodies. Much of the NOx formed is not the result of combustion of N2 within the FCC regenerator, but rather combustion of nitrogen-containing compounds in the coke entering the FCC regenerator. Bi-metallic combustion promoters are probably best at minimizing NOx formation from N2.

I have discovered a way to overcome most of the deficiencies of the prior art methods of burning of coal or coke or similar substances in a dense phase fluidized bed. I have overcome several problems left unsolved by the prior art, particularly in the area of efficiency of use of the CO combustions promoters and in the area of reduced emissions of NOx. I use conventional CO combustion promoter metals on an unconventional catalyst support in an unconventional way.

By putting my Pt, or other CO combustion promoter, on a porous support, I can achieve complete CO combustion using orders of magnitude less Pt than was used in the experimental work reported in U.S. Pat. No. 4,515,092.

By putting the CO combustion promoter on a special support, I can achieve segregation of most of the CO combustion promoter within the upper portion of a dense phase fluidized bed and significantly reduce NOx emissions while maintaining satisfactory CO combustion. The approach was, in a sense, to turn the teaching of U.S. Pat. No. 3,808,121 upside down. The '121 patent added large-sized particles containing a CO combustion-promoting metal into an FCC regenerator. These particles because of their size and weight congregated at the bottom of the FCC regenerator dense bed. Withdrawal of hot regenerated catalyst occurred from an upper level of the FCC regenerator dense bed, so only the small-sized FCC catalyst cycled back and forth between the reactor.

In my process the CO combustion promoter preferably is concentrated in the upper portions of the dense phase fluidized bed.

BRIEF SUMMARY OF THE INVENTION

Accordingly, the present invention provides in a coal combustion process wherein oxygen or an oxygen containing gas is added to a single, dense phase fluidized bed comprising coal particles having an average particle and and average settling velocity, said dense bed comprising a lower one half and an upper one half, and wherein coal is burned in the dense bed to produce heat and a flue gas containing CO, CO2, O2 and NOx, the improvement comprising adding 0.001 to 100 wt ppm of a CO combustion promoter to increase the combustion of CO to CO2 in the dense bed, said CO combustion promoter being disposed on a porous support.

In another embodiment, the present invention provides in a process for the combustion of pulverized coal particles having a density, particle size and settling velocity in a single, dense phase fluidized bed comprising a lower two thirds and an upper one third, and wherein the coal is burned in the dense bed to produce heat and a flue gas containing CO, CO2, O2 and NOx, the improvement comprising adding a CO combustion promoter in an amount sufficient to increase the combustion of CO to CO2 in the dense bed, said CO combustion promoter being disposed on particles having a settling velocity which is smaller than the settling velocity of the average of the particles in the dense bed whereby said CO combustion promoter segregates in the dense phase fluidized bed so that a majority of the combustion promoter is present in the upper one third of the dense bed, and addition of oxygen or an oxygen containing gas is limited to maintain a reducing atmosphere in the lower two-thirds of the dense bed and convert therein at least a portion of the NOx produced during coke combustion to nitrogen in the reducing atmosphere.

BRIEF DESCRIPTION OF THE DRAWINGS

FIG. 1 is a simplified view of a fluidized bed combustion vessel with floating, large particles of CO combustion promoter.

FIG. 2 is a simplified schematic diagram of a dense bed coal combustor with a segregated layer of CO combustion promoter on fines.

FIG. 4 shows how NOx emissions from an FCC regenerator vary as a function of relative Pt concentration on FCC catalyst.

DETAILED DESCRIPTION

Fuel

Figure 3:
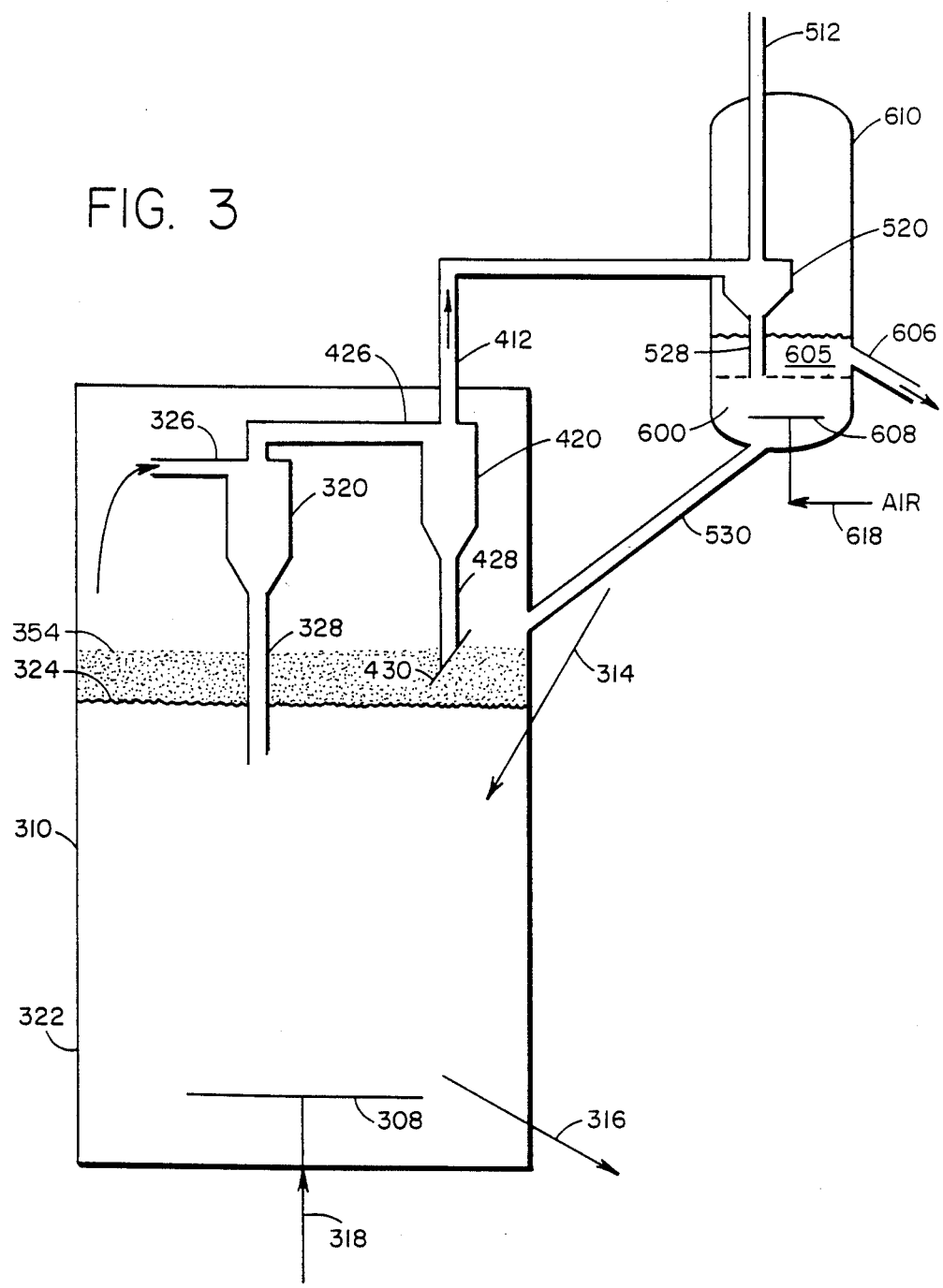
FIG. 3 is a simplified schematic diagram of a preferred fluid bed coal combustor of the invention, with an external promoter recovery means using density differences to recover promoter from coal fines.

Any combustible, fluidizable substance can be used as fuel in the fluidized bed combustion process and apparatus of the present invention. The process works well using fuels such as coal, coke, wood chips, ground paper waste, and similar materials. In many instances coal will be the preferred fuel, because it is cheap and because the copious amount of fines produced can be readily accommodated.

Dense Phase Fluid Bed

The bed preferably comprises a single, dense phase fluidized bed, with a relatively sharp demarcation between the dense phase and the dilute phase above it.

Bed Geometry

Preferably the bed has a length to diameter ratio, L/D of at least one, and more preferably, at least 2, as measured by the length of the dense phase bed to the diameter of the vessel containing the dense phase bed.

A non-uniform bed is preferred to minimize superficial vapor velocity near the top of the bed. This reduced vapor velocity increases the sharpness of the break between the dense phase bed and the dilute phase bed, and aids in keeping the preferred CO combustion promoters, discussed below, in the dense bed. The non uniform bed geometry may be attained by a flaring outward of the vessel containing the dense bed, but preferably is achieved by a sudden change in bed diameter. Thus the bottom 50% (by volume) of the dense phase fluidized bed could be contained in a vessel of 1 m diameter which is contiguous with, and discharges up into, a 2 m diameter vessel. The sudden change in vapor velocity will increase the retention of the CO combustion promoter while allowing much of the coal combustion to occur in a more robustly fluidized region (the 1 m diameter portion), where vigorous fluidization and rapid coal combustion to CO/CO2 occur.

Combustion Conditions

The temperatures, pressures, oxygen flow rates, etc., are within the broad ranges of those heretofore found suitable for fluidized bed coal and coke combustion. The process and apparatus of the present invention also allows substantially complete combustion of CO to CO2 within the dense phase fluidized bed at lower temperatures than were heretofore thought suitable for fluid bed coal combustion. Lower temperature operation greatly simplifies the design and operation of the units, and minimizes start-up problems.

Suitable and preferred operating conditions are:

|  | Broad | Preferred |
| --- | --- | --- |
| Temperature, F. | 1100–1700 | 1150–1400 |
| Avg. Coal/coke Residence Time, Seconds | 6–7200 | 60–6000 |
| Pressure, atmospheres | 1–10 | 2–5 |
| % Stoichiometric O2 | 100–120 | 100–105 |

CO Combustion Promoter

Use of a CO combustion promoter in the dense phase fluidized bed combustion zone is essential for the practice of the present invention, however, these materials are well-known for use in other processes, e.g., FCC units. In general terms, roughly the same amounts of promoter can be used in coal/coke combustion as in FCC regeneration, provided that the CO combustion promoter is efficiently distributed on a porous support.

U.S. Pat. No. 4,072,600 and U.S. Pat. No. 4,235,754, the contents of which have been incorporated by reference, disclose operation of an FCC regenerator with minute quantities of a CO combustion promoter. From 0.01 to 100 ppm Pt metal or enough other metal to give the same CO oxidation, may be used with good results. Very good results are obtained with as little as 0.1 to 10 wt. ppm platinum present on the catalyst in the unit. An amount of promoter which would give a CO oxidation activity equal to 0.3 to 3 wt. ppm of platinum is preferred.

CO combustion promoter may be used to promote total or partial combustion of CO to CO2 within the dense phase bed of coal or coke. More CO combustion promoter can be added without undue bad effect—the primary one being the waste of adding more CO combustion promoter than is needed to burn all the CO.

Preferably, the CO combustion promoter is on a support which is readily segregable from the bulk of the material in the fluidized bed. In one preferred embodiment of the present invention, the CO combustion promoter is on a material with about the same density as the coal/coke/etc, but the promoter has a smaller particle size so that it tends to congregate in the upper portion of the dense phase fluidized bed.

The most preferred promoter, from a standpoint of maximum promoter life in the unit, and minimum loss with fines, is one which is a solid particle, with a volume at least b 10 times that of the average size of the fluidized particulates in the dense bed, and having a low density, relative to the dense bed density, so that the promoter floats to the top of the dense bed of particulates in the regenerator.

Very large hollow particles may be used, such as alumina ping pong balls impregnated with platinum. Hollow tubes of extrudate, plugged at the ends and impregnated with Pt will also serve. Large particles, with a strong, dense alumina or silica shell, over a core of low density, soft alumina or other material may also be used.

The CO combustion promoter may also be placed on particles which are the same size as the bulk of the particles in the fluidized bed, but of much lower density.

The promoter may also be placed on particles which are smaller than the bulk of the particles in the fluidized bed, but of much higher density.

The use of small size, high density promoters ensures that the promoter will be readily fluidized, and tend to collect or segregate in the upper portions of the dense bed. The greater density will facilitate recovery of the promoter from fines in downstream recovery operations. The high density promoter will also be exceptionally strong and resistant to attrition in the dense phase fluidized bed.

For maximum effectiveness, when small size promoter supports are used, the promoter particle size distribution should have a relatively narrow range, i.e., the promoter size can be critical. If the promoter contains large amounts of particles which have a particle size similar to the coal or coke, then it will be difficult to achieve the desired segregation of promoter in the upper portions of the FCC regenerator dense bed to minimize NOx emissions.

When NOx emissions are not a concern, then any readily fluidizable CO combustion promoter can be used. The most effective use of a fluidizable CO combustion promoter will be made when the promoter does not gravitate to the bottom of the dense bed. The promoter is needed near the top of the dense bed, to ensure that complete afterburning of CO occurs within the dense bed. To achieve maximum effectiveness, the promoter should have a different particle size distribution than the bulk of the particulates in the dense bed.

Use of large size support, e.g. 80–200 micron size particles, will not cause Pt to be lost from the system, just a degradation in segregation which will reduce somewhat the skewed Pt distribution sought in the regenerator.

When fine, relatively high density promoter supports are used the bulk of the promoter particles should be in the range of 5–75 microns, with most of the particles, by weight, being less than 60 microns, and less than 10% by weight being less than 10 microns. Preferably most of the promoter is in the form of 20–50 micron particles.

The optimum particle size is also a function of promoter support density, and of the size and density of the material in the dense bed.

When the Pt is placed on the "fines", the preferred support will have a relatively high density. High density supports have greater strength than low density supports, and thus will last longer in the erosive environment of the dense phase fluidized bed. Denser particles will also be retained longer in the unit, so that there will be less loss of Pt with coal fines, ash, dust, etc.

The most preferred support will be one which will have a significantly different density than the fines produced.

Combustion Promoter Segregation

Preferably, the CO combustion promoter is used in the form of large, low density particles which "float" on the dense bed. When floaters are used, the preferred support is a relatively fine particulates (as compared to the bulk of the material in the fluidized bed) which tend to accumulate or segregate to the top of the fluidized bed.

Most of the CO combustion promoter should be in the upper one half of the dense bed, and preferably most of the promoter is in the upper ⅓ (by volume) of the fluidized dense bed.

This minimizes NOx emissions and maximizes the effectiveness of the Pt. Promoter segregation allows much of the coal or coke combustion to occur in a relatively reducing atmosphere, with large amounts of CO present. Effectiveness of use of Pt CO combustion promoter is maximized because the promoter collects in the upper portions of the bed and acts as a catalytic filter to eliminate or reduce CO emissions.

Use of a heavy, settling promoter would avoid all loss or carry over of promoter, but would not be effective in converting CO formed by combustion of coal or coke in the upper portions of the fluidized bed. CO formed near the top of the bed will not be catalytically afterburned to CO2 by CO combustion promoter which collects in the lower portions of the fluidized dense bed.

Promoter segregation is promoted by minimizing bed turbulence and large velocity gradients in the dense bed. As discussed previously, in the section labelled bed geometry, an increase in bed diameter is a good way to reduce vapor velocity, and have a sharper distinction between dense bed and dilute phase.

The size and density of the CO combustion promoter should be selected so that the promoter will have a terminal velocity below that of the fines rejected during normal operations.

The CO combustion promoter may be a drum of the Pt on alumina material available from several vendors for use in FCC units. The Pt should be on a highly porous support for maximum effectiveness.

Promoter Recycle

When a promoter on "fines" is used, these promoters will be readily swept out of the fluidized dense bed. The same properties which cause segregation of the promoter within the dense bed also cause preferential loss of promoter from the dense bed, as compared to the larger sized coal, dolomite, or other particulates making up most of the dense bed.

High loss of promoter can often be justified, if it allows a unit to continue operating without exceeding local limits on NOx emissions or if the efficiency of the unit is sufficiently improved. In those instances where there is excessive loss of promoter with fines discharged in the flue gas it will be beneficial to recover the promoter from the fines discharged with the flue gas and recycle the promoter to the dense bed.

Use of a CO combustion promoter on a dense material will permit separation of promoter from fines downstream of the dense bed combustion unit. Separation may be poorly but easily done in another fluidized bed, with the more dense particles settling to the bottom of the bed. Usually the CO combustion promoter particles will be the denser, but by careful selection of the promoter support, and depending on the density of the bulk of the material in the dense bed, the promoter may be either the light or the dense material relative to the density of the material making up the bulk of the dense bed.

The preferred way to separate combustion promoter from fines is by putting the fines and promoter in a fluid with a density intermediate the fines and the CO combustion promoter. If the CO combustion promoter is on a dense support, with an apparent bulk density (ABD) greater than one, and a true density in water in excess of 3-4 g/cc, and the coal ash and fines have a true density in water less than that of the promoter, then flotation separation in a dense fluid, such as a brine can be used to recover promoter for recycle to the unit or for promoter metal recovery.

Conventional methods of augmenting separation of liquid phases based on density differences, such as centrifuging, may be used to improve the efficiency of separation.

A ballistic separation technique can also be used, relying on the different settling velocity of the promoter and the fines in a gas.

Of these promoter recovery methods, the separation by flotation or density separation in a liquid will yield the sharpest separation, but may not be justified in some instances because of the cost of wetting, phase separation, etc.

Depending on the amount of CO combustion promoter used in the process, and lost with the fines, it may be desirable to operate with several stages of fines/promoter separation. All of the material discharged with the flue gas may be subjected to a first, rather crude, separation by relying on density differences in a small, ancillary fluidized bed to bring about some recovery of combustion promoter. Next a liquid phase separation may be used to recover some of the promoter particles for reuse.

The cost of the recovery methods can be minimized by accepting only mediocre recovery of promoter, and spending only minimal amounts to effect promoter recovery from fines.

For each pass of gas through the coal combustion zone, more than 99% of the promoter inventory should be retained within the fluidized bed coal combustion chamber, either due to natural settling or by use of one or more stages of cyclone separation.

When an external promoter recovery means is used, it should recover at least 10% of the platinum, or other promoter metal. Preferably at least 50% of the promoter is recovered in an external means and recycled to the coal combustion zone.

The invention will now be described in more detail with reference to the Figures.

FIG. 1 shows a dense bed coal combustor 10 which can be used in the practice of the present invention. First the conventional operation will be discussed.

Coal or coke is added to combustor 10 via line 14. Oxygen containing gas, preferably air, is added via line 18 to conventional air distributor 8 in the lower portion of the dense bed. Coal or coke is burned to CO and CO2 in the dense bed 22 of the regenerator. Enough additive, preferably an alumina with 1-1000 wt. ppm Pt is present to add the desired amount, typically 0.1 to 10 ppm Pt, to the dense bed. Most of the CO formed in the dense bed is rapidly burned to CO2 in the dense bed. Solids, such as ash, slag, etc., may be withdrawn via line 16.

The dense bed of coal, dolomite, etc., 22 has an upper level 24. Products of combustion, typically NOx, SOx, CO2, minor amounts of CO, minor amounts of oxygen, and inerts such as nitrogen, pass from dense bed 22 through one or more layers of large, low density particles containing CO combustion promoter into dilute phase 32. A significant amount of ash and perhaps some fine coal will usually be entrained in the flue gas, so the flue gas may be passed via inlet 26 to a cyclone 20 to recover entrained coal fines so that reduced solids flue gas can be discharged via line 12. Entrained coal and fines, and, sporadically, some promoter particles 53, removed by cyclone 20 from flue gas are discharged through dipleg 28 back into the dense bed of coal 22.

The coal combustor 10 may have heat removal means in the dense bed, the dilute phase, or in the flue gas line. Heat exchange coil 41 is shown immersed in the dense bed, with a fluid added via line 40 and removed via line 42. A coil 51 is shown in the dilute phase region, with a cool fluid added via line 50 and heated fluid removed via line 52. External heat exchangers may also be used. Heat exchange may be enhanced by the presence of large amounts of relatively inert solids, such as sand, or of sulfur accepting materials such as dolomite. Heat removal from fluidized dense beds, dilute phases, or from flue gas is conventional and forms no part of the present invention Although only a single cyclone is shown in the drawing, two or more sets of cyclones, primary and secondary, may be used. A unit might have eight primary cyclones in parallel, each discharging into a secondary cyclone, resulting in 16 cyclones in all. In addition, third or even higher stage cyclones can be used to recover more coal and fines for return to the dense bed. Electrostatic precipitators, porous stainless steel filters, and similar devices can all be used to recover small sized particles and return them to the dense bed.

The process of the present invention may be implemented into a coal combustor such as that of FIG. 1 by adding a CO combustion promoter which tends to collect in the upper portions of the dense bed. Addition of somewhat smaller sized combustion particles, or particles which aid fluidization and heat transfer such as sand, in conjunction with use of coarse coal will result in a net migration of CO combustion promoter to the upper portions of the dense bed of coal.

When there is segregation of CO combustion promoter within the upper portions of the dense bed, there is less CO combustion promoter in the bottom of the dense bed, permitting significant concentrations of CO to be present there. Although not all of the carbon monoxide is afterburned to CO2 within the lower portion of the dense bed of the regenerator, much, if not a majority, of the coal or coke is burned there. As it burns, the nitrogen compounds burn to NOx. The NOx formed reacts with the CO to form CO2 and N2. Much of the remaining CO is combusted to CO2 within the upper portions of the dense bed where most of the CO combustion promoter is located.

Further modifications can also be made to optimize operation, e.g., restricting somewhat the amount of air that is added to the bottom of the dense bed and optionally adding additional combustion air to the upper portion of the dense bed. This helps ensure that there is a reducing atmosphere in the lower portion of the bed and an oxidizing atmosphere in the upper portion of the bed. Most of the combustion air should be added to the bottom of the dense bed. When split air addition is practiced, from 1-50% of the air can be added to the upper portion of the bed, preferably 3-30%.

A drawback to the approach of FIG. 1, when small particles of relatively dense CO combustion promoter, or particles of low density CO combustion promoter (having a particle size similar to that of most of the material in the dense bed) are used, is somewhat higher loss of CO combustion promoter. This is because a certain portion of the promoter is lost with the flue gas, despite the use of a cyclone separator. Another minor problem with the use of a dipleg 28, as shown in the figure, is that a significant amount of the entrained CO combustion promoter returned via the dipleg is mixed into the bulk of the dense phase fluidized bed. The increased concentration of CO promoter near interface 24 may not be achieved to the extent desired.

FIG. 2 shows some modifications which aid in establishing an increased concentration of CO combustion promoter in the upper portion of the dense bed.

FIG. 2 shows the addition of a secondary cyclone 120, receiving flue gas via exhaust line 126 from primary cyclone 20. Flue gas, with a substantially reduced content of entrained coal, fines and the CO combustion promoter, is removed from the system via line 112. Coal and fines, and CO combustion promoter are discharged from cyclone 120 via dipleg 128 to the upper portion of the dense bed 22. The figure shows a layer of fines 54 distributed across the top 24 of dense bed 22. The figure exaggerates the extent of fines segregation that can be achieved, i.e., in practice it will be difficult to observe a discrete fines phase, but there will be a concentration of fines in the upper regions of the dense bed. Flapper valve 130 at the bottom of dipleg 128 is a conventional design which allows fine particles to leave dipleg 128, but does not allow flue gas to enter the standpipe. A seal pot or flow control valve on the dipleg would accomplish the same thing, prevention of reverse flow up dipleg 128.

FIG. 2 shows addition of secondary air to an upper portion of the dense bed via line 218 and distributor 208. This helps maintain a reducing atmosphere in the lower portion of dense phase fluidized bed 22.

Further modifications of the design shown in FIG. 1 or in FIG. 2 can be made such as extra stages of cyclones, bag filters, porous stainless steel filters, electrostatic precipitators and the like to recover, and preferably recycle, promoter to the dense bed, preferably the upper portion of it. Selective removal of fines, with a high concentration of CO combustion promoter, also permits regeneration or recovery of the promoter. This can be economically advantageous when platinum or other expensive noble metals are used as CO combustion promoters. It also facilitates rapid change in promoter composition if an operator wants to go from a mono-metallic promoter to bi-metallic promoter or the reverse.

The embodiment shown in FIG. 3 is a preferred embodiment of the present invention, which allows for at least one external stage of recovery of high density promoter from fines and ash.

In this embodiment, coal combustor 310 functions like combustor 10 shown in FIG. 2. Fresh coal is added via line 314, while ash, slag, etc., is removed via line 316. Combustion air is added via line 318 and distributor 308.

CO combustion promoter tends to segregate and collect in the upper regions of dense phase fluidized bed 322. Quite a lot of the CO combustion promoter can be swept out because primary and secondary secondary cyclones 320 and 420 recover preferentially coal and combustion promoter, respectively. The fines, and a fair amount of combustion promoter, can be removed via flue gas outlet 412 and passed to a promoter recovery means 610 comprising a third stage of gas/solids separation, shown as a cyclone 520 in the Figure. The third stage recovers much of the CO combustion promoter, preferably in excess of 50%, and discharges this promoter along with large amounts of fines down via dipleg 528 into bed 605. A small amount of fluidization gas, such as air, nitrogen, etc., is admitted via line 618 and distributor 608, to gently fluidize the dense bed of ash and CO combustion promoter. Promoter, when on a high density support, tends to settle to the bottom of the vessel and can be easily recycled to the dense bed, preferably to an upper portion thereof, via line 530. Coal ash fines can be removed via line 608 for disposal, or further processing, by means not shown, for additional recovery of CO combustion promoter. A flue gas with a much reduced solids content is discharged via flue gas outlet 512.

Although third stage cyclones are shown in the Figure, operating directly on the flue gas from the unit it may be preferred in many units to use electrostatic precipitators, a bag house, or other conventional means to collect much of the fines and dust discharged from the fluidized bed coal combustion process. All or a portion of the recovered fines, etc., recovered in this way may be charged to a relatively small fluidization vessel to permit a separation of promoter from fines by density differences. Alternatively, or in addition to this separation, the fines may be placed in a liquid with a density intermediate the fines and the promoter. This can effect a very sharp separation between promoter and fines.

EXAMPLE 1—CONVENTIONAL CO OXIDATION PROMOTER

The CO combustion promoter is a Pt on alumina additive with the properties shown in Table 1. These additives, and many more, are commercially available. The use of these materials is conventional in FCC regenerators, but not, so far as is known, in fluidized bed coal combustion units.

TABLE 1

| Conventional CO Oxidation Promoters | | |
|---|---|---|
| | A | B |
| Real Density, g/cc | 2.718 | 2.718 |
| Particle Density, g/cc | 1.597 | 1.619 |
| MSA Particle Size Distribution, % wt | | |
| 0-20 microns | 2.4 | 0.0 |
| 20-40 microns | 12.2 | 13.2 |
| 40-60 microns | 31.7 | 34.2 |
| 60-80 microns | 29.3 | 31.5 |
| 80+ microns | 24.4 | 21.1 |
| Average Particle Size, microns | 62.1 | 61.3 |
| Platinum Promoter Level, ppm | 101 | 431 |

This example is provided to show the particle size distribution of conventional CO combustion promoters. The particle size distribution is similar to the particle size distribution of conventional FCC equilibrium catalyst.

EXAMPLE 2—FINES SEGREGATION—LARGE GRADIENT

This example shows the efficient separation of relatively fine from relatively coarse particles that can be achieved in a dense phase fluidized bed when there is a relatively large gradient or difference in particle size distribution.

R. A. Kolbe reported that in a fluidized bed, with an L/D of about 2.4, a mixture of 28-60 mesh particles and particles less than 325 mesh segregated quite sharply when the superficial gas velocity up through the bed was 0.8 feet per second. The upper ½ of the dense phase fluidized bed contained 90 wt % less than 325 mesh particles and 10 wt % 28-60 mesh particles. The lower ½ of the dense bed contained roughly 100 wt % 28-60 mesh particles. Data from R. A. Kolbe, PhD Thesis, University of West Virginia (1952).

Kolbe's data show excellent particle separation, but do not correspond to conditions in fluidized bed coal combustion units. The fluidized bed of coal would contain a much broader spectrum of particles, ranging from lumps the size of rocks and gravel down to fine ash. These data show that a CO combustion promoter on a support with a much smaller particle size than the particle size of the coal in the dense bed can be sharply segregated. The data do not address retention or recycle of the fine particles (the less than 325 mesh material). These particles are probably a little smaller than would be optimum for use in fluidized coal combustion units.

EXAMPLE 3—FINES SEGREGATION—SMALL GRADIENT

This example shows that significant separation of fine from somewhat coarser particles can be achieved in a dense phase fluidized bed even when there is a relatively small gradient or difference in particle sizes.

These data are reported by G. L. Osbelg and D. H. Charlesworth, Chem Eng. Prog. 566, (1951).

| | Relative con. of 50 micron fines | |
|---|---|---|
| Avg. Bed Part. | In Bottom ⅓ | In Top ⅓ Bed |
| 68 microns | 1.0 | 3.2 |
| | Conc. 36 micron fines, Wt % | |
| Avg. Bed Part. | In Bottom 95% | In Top 5% Bed |
| 58 microns | 1.73 | 2.47 |
| 68 microns | 1.98 | 3.04 |
| 145 microns | 1.76 | 2.51 |

These data were obtained at a superficial gas velocity of 11.9 cm/s. The superficial gas velocity at incipient fluidization was less than 4 cm/s, so it was a well fluidized bed, which would tend to be well mixed and degrade separation of fine from coarse particles. The Bed L/D was 2.

These data show that significant segregation of 50 micron size particles can occur in fluidized bed with an average particle size of 68 microns. Many conventional FCC units operate with catalyst inventories having an average particle size of 60-80 microns. It is fairly easy to design primary and secondary cyclones to recover essentially all of the particles of 50 microns and larger, indeed, most operating FCC units routinely recover essentially all of the particles in excess of 20 microns and keep them in the unit. These data are significant to combustion of coal in a fluidized bed in that these data represent the amount of segregation that can be achieved despite very small differences in particle size, and despite fairly vigorous fluidization.

EXAMPLE 4—NOX V. PT

Examples 2 and 3 show that it is possible to concentrate fine particles in the upper portions of dense phase fluidized beds.

Example 4 studies the effect of Pt concentration on NOx emissions. This test was done in a commercial FCC regenerator. The data are reported on FIG. 4.

The FCC reacror operating conditions were:

| | |
|---|---|
| Top temperature | 970 F. |
| Combined Feed Ratio | 1.05 |
| Catalyst to oil ratio | 5.0 |
| Reactor pressure | 28 psig |
| Conversion | 60 vol. % |

The feed contained 1600 ppm nitrogen. The FCC regenerator operated with an average dense bed temperature of 1280 F. There was 1.0 volume % $O_2$ in the regenerator flue gas.

Tests were conducted in a commercial FCC unit, operating with a single dense bed of catalyst in the regenerator. The CO combustion catalyst was uniformly distributed within the regenerator. The flue gas contained 2100 mg/Nm3 of NOx, 70 ppm CO, 1.0 mole % O2 at 7 ppm Pt on catalyst. Other tests were conducted with different levels of Pt, to generate the data represented by FIG. 3.

FIG. 4 shows how NOx content of the flue gas depends on Pt concentration in the dense bed. By segregating the Pt in the top of the dense bed, by using catalyst fines with Pt, or floating Pt impregnated balls, the Pt content in the portion of the bed where the NOx is formed will approach 0 and, according to the graph, NOx emissions will decrease. For example, reducing the Pt content in the bottom of the bed from 7 ppm to 3 ppm will decrease NOx from 2100 mg/Nm3 to 900 mg/Nm3. By floating the remaining Pt on the top of the bed, almost complete CO combustion can be maintained while keeping the NOx levels at a low level associated with lower Pt levels.

COMMERCIAL APPLICATION

As applied to coal or coke combustion in dense phase fluidized beds, three extremes of operation should be considered:

A. conventional—no promoter
B. invention—with promoter uniformly distributed
C. invention—with promoter segregated to top of dense bed.

Conventional operation is well known. It requires high temperatures, large amounts of excess air, and relatively high NOx emissions in some instances.

Operation with a CO combustion promoter on a porous, high surface area support, with the promoter distributing more or less uniformly throughout the dense bed, will permit coal combustion to proceed at lower temperatures. Startup of the unit will be smoother, and both excess air and CO emissions can be reduced. NOx emissions can be increased by such operation, or decreased. NOx emissions can be profoundly reduced by operating the coal combustion unit in a partial combustion mode. By this, I mean that all of the coal will be burned, but combustion air will be limited to maximize production of CO. Smooth, stable operation can be achieved, but fairly large amounts of Pt, etc. will be needed to ensure smooth operation. I estimate that 1-10 ppm Pt on a high surface area support will give good results. The flue gas produced will contain roughly equimolar amounts of CO and CO2, and can be burned in a CO combustion boiler. This mode of operation provides a way to shift much of the combustion, and problems of flue gas clean up, to a unit which is remote from the fluidized bed coal combustion process.

Operation with a CO combustion promoter on a support which segregates in the upper regions of the dense bed, or floats on top of it, will permit efficient coal combustion, while making better use of the Pt or other combustion promoting metal. Additionally, NOx emissions can be reduced by operating the lower portions of the dense bed in a generally reducing atmosphere, and the upper portion in a more oxidizing atmosphere. The problem of Pt loss is minimized either by using large hollow particles which float, but which are not easily transported into the dilute phase above the dense bed or by using elutriable particles (such as 50 micron particles of alumina) and providing one or more stages of promoter recovery inside of or external to the dense bed. Promoter recovery by density difference in an external fluidized bed, or in an external flotation zone may be used to recover promoter for recycle, and provide a way to remove ash agglomerates which may accumulate in the system.

If practicing the claimed invention today I would use a CO combustion promoter in the form of ½" diameter particles, with a density of about 0.4 g/cc. Hollow ceramic tubes or metal tubes sealed at the ends and coated with porous ceramic or refractory could also be used. These particles will float on top of the dense bed of fluidized particles of coal. The promoter will have a high settling velocity, and will be easily retained in the dense bed and not swept out with the flue gas.

If Pt on "fines" is used, I would add 40-60 micron particles, with an ABD of about 1.0-1.1 g/cm3 into the fluidized bed coal combustion zone. These will segregate to the upper ⅓, or even the upper 1/10 of the dense phase fluidized bed of coal. I would carefully control the amount of excess air added. With CO combustion promoter it is now possible to operate with roughly stoichiometric air while still achieving essentially complete CO combustion. When NOx emissions are a concern, control of the air rate is even more important, addition of too much excess air makes it hard to create a reducing atmosphere in the lower portion of the dense bed. Addition of insufficient air would result in increased CO emissions, which could be compensated to some extent by use of more CO combustion promoter. I would use 1 or 2 stages of cyclones, depending on the size of the fines and ash to be rejected and the size of the coal particles to be retained in the unit. The cyclone diplegs would discharge near the upper portions of the dense bed.

Preferably 60 to 90% of the CO combustion promoter is in the upper half of the dense bed.

Promoter levels will be about the same, or slightly higher than used conventionally in FCC units, e.g., 0.1 to 10 ppm Pt, or its equivalent in other combustion promoter metal.

I claim:

1. In a coal combustion process wherein oxygen or an oxygen containing gas is added to a single, dense phase fluidized bed comprising coal particles having an average particle and and average settling velocity, said dense bed comprising a lower one half and an upper one half, and wherein coal is burned in the dense bed to produce heat and a flue gas containing CO, CO2, O2 and NOx, the improvement comprising adding 0.001 to 100 wt ppm of a CO combustion promoter to increase the combustion of CO to CO2 in the dense bed, said CO combustion promoter being disposed on a porous support and wherein the porous support particles have a settling velocity which is smaller than the settling velocity of the average particles in the dense phase fluidized bed whereby said CO combustion promoter segregates in the dense phase fluidized bed so that a majority of the combustion promoter is present in the upper one half of the dense bed.

2. The process of claim 1 wherein the addition of oxygen or oxygen containing gas is limited to maintain a reducing atmosphere in the lower one half of the dense bed and converting therein at least a portion of the NOx produced during combustion of coal to nitrogen in the reducing atmosphere.

3. The process of claim 1 wherein the amount of oxygen or oxygen containing gas is limited to limit CO combustion to produce a flue gas containing at least 5.0 mole % CO.

4. The process of claim 1 wherein essentially complete CO combustion occurs in the dense bed to produce a flue gas containing at least an order of magnitude more CO2 than CO, on a molar basis.

5. The process of claim 1 wherein the CO combustion promoter has an average particle size within the range of 20-60 microns.

6. The process of claim 1 wherein the CO combustion promoter has an average particle size within the range of 30-50 microns.

7. The process of claim 5 wherein the CO combustion promoter has an apparent bulk density of 0.9 to 2.0 g/cc.

8. The process of claim 5 wherein the CO combustion promoter has an apparent bulk density of 1.0 to 1.2 g/cc.

9. The process of claim 1 wherein the CO combustion promoter comprises 0.01 to 50 ppm of platinum group metal or other metal with an equivalent CO oxidation activity, on an elemental metal basis, based on the weight of particles in the dense bed.

10. The process of claim 1 wherein the CO combustion promoter is entrained in the flue gas from the dense bed and primary and secondary stages of cyclone separation are provided in the combustion zone for recovery of coal fines and promoter from flue gas, and wherein promoter recovered from the second cyclone stage is discharged above the dense phase fluidized bed.

11. The process of claim 1 further characterized in that additional oxygen or oxygen containing gas is added to the upper one-half of the dense bed.

12. The process of claim 1 wherein a flue gas stream comprising fines and entrained CO combustion promoter is removed from the fluidized bed combustion process, a mixture of fines and entrained CO combustion promoter is recovered from the flue gas, and the mixture is resolved into a CO combustion promoter rich phase and a fines phase with a reduced concentration of CO combustion promoter, and the promoter rich phase is recycled to the fluidized bed combustion process.

13. The process of claim 12 wherein the mixture is resolved by fluidization in a dense phase fluidized bed external to the fluidized bed combustion process.

14. The process of claim 12 wherein the CO combustion promoter has a density and the fines have a density which is different from the density of the CO combustion promoter and the mixture is added to a liquid with a density intermediate the density of the fines and the CO combustion promoter, and the CO combustion promoter in the CO combustion promoter rich liquid phase is recycled to the fluidized bed combustion process.

15. The process of claim 1 wherein the dense phase fluidized bed has a vertical length to horizontal diameter ratio of at least 2.

16. The process of claim 1 wherein the dense phase fluidized bed has a varying cross sectional area, and the cross sectional area at the top of the dense bed is at least twice the cross sectional area at the base thereof.

17. In a process for the combustion of pulverized coal particles having a density, particle size and settling velocity in a single, dense phase fluidized bed comprising a lower two thirds and an upper one third, and wherein the coal is burned in the dense bed to produce heat and a flue gas containing CO, CO2, O2 and NOx, the improvement comprising adding a CO combustion promoter in an amount sufficient to increase the combustion of CO to CO2 in the dense bed, said CO combustion promoter being disposed on particles having a settling velocity which is smaller than the settling velocity of the average of the particles in the dense bed whereby said CO combustion promoter segregates in the dense phase fluidized bed so that a majority of the combustion promoter is present in the upper one third of the dense bed, and addition of oxygen or an oxygen containing gas is limited to maintain a reducing atmosphere in the lower two-thirds of the dense bed and convert therein at least a portion of the NOx produced during coke combustion to nitrogen in the reducing atmosphere.

18. The process of claim 17 wherein a flue gas stream comprising fines and entrained CO combustion promoter is removed from the process, a mixture of fines and entrained CO combustion promoter is recovered from the flue gas, and the mixture is resolved by fluidization in a dense phase fluidized bed external to the dense phase fluidized bed into a CO combustion promoter rich phase and a fines phase with a reduced concentration of CO combustion promoter, and the promoter rich phase is recycled to the dense phase fluidized bed.

19. In a coal combustion process wherein oxygen or an oxygen containing gas is added to a single, dense phase fluidized bed comprising cool particles having an average particle and and average setting velocity, said dense bed comprising a lower one half and an upper one half, and wherein coal is burned in the dense bed to produce heat and a flue gas containing CO, CO2, O2 and NOx, the improvement comprising adding 0.001 to 100 wt ppm of a CO combustion promoter to increase the combustion of CO to CO2 in the dense bed, said CO combustion promoter being disposed on a porous support and wherein the porous support is in the form of particles having an average diameter at least 10 times the average diameter of the average particle in the dense bed and the promoter particles having a density less than the average density of the particles in the fluidized bed and wherein said promoter particles float on top of the dense bed.

* * * * *